US009874805B2

(12) United States Patent
Okuda

(10) Patent No.: US 9,874,805 B2
(45) Date of Patent: Jan. 23, 2018

(54) LIGHT SOURCE APPARATUS AND PROJECTION DISPLAY APPARATUS

(71) Applicant: Panasonic Intellectual Property Management Co., Ltd., Osaka (JP)

(72) Inventor: Michihiro Okuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 129 days.

(21) Appl. No.: 15/008,187

(22) Filed: Jan. 27, 2016

(65) Prior Publication Data

US 2016/0223890 A1    Aug. 4, 2016

(30) Foreign Application Priority Data

Jan. 30, 2015  (JP) ................................ 2015-016838
Dec. 25, 2015  (JP) ................................ 2015-253863

(51) Int. Cl.
*G03B 21/20* (2006.01)
*G02B 26/00* (2006.01)
*G02B 26/08* (2006.01)
*G02B 27/14* (2006.01)

(52) U.S. Cl.
CPC ......... *G03B 21/204* (2013.01); *G02B 26/008* (2013.01); *G02B 26/0833* (2013.01); *G02B 27/141* (2013.01); *G02B 27/149* (2013.01); *G03B 21/2013* (2013.01); *G03B 21/2066* (2013.01)

(58) Field of Classification Search
CPC .... G03B 21/28; G03B 21/204; G03B 21/208; G03B 21/2013; G03B 21/2033; H04N 9/3158; H04N 9/3161; H04N 9/3164
See application file for complete search history.

(56) References Cited

U.S. PATENT DOCUMENTS

| 2009/0141242 | A1 | 6/2009 | Silverstein et al. |
| 2010/0245777 | A1* | 9/2010 | Ogura ................. G02B 5/0215 353/38 |
| 2010/0328554 | A1* | 12/2010 | Shibasaki ........... H04N 9/3161 348/760 |
| 2012/0133903 | A1 | 5/2012 | Tanaka |

(Continued)

FOREIGN PATENT DOCUMENTS

| JP | 2011-505593 A | 2/2011 |
| JP | 2012-133337 A | 7/2012 |

(Continued)

*Primary Examiner* — Sultan Chowdhury
(74) *Attorney, Agent, or Firm* — McDermott Will & Emery LLP

(57) ABSTRACT

A light source apparatus according to the present disclosure includes: a first light source unit which emits a blue light in a first direction; a second light source unit which emits a blue light in a second direction which intersects with the first direction; a split/combining optical element which splits the blue lights emitted from the first light source unit and the second light source unit, into a first optical path and a second optical path; a light emitting body which is provided on the first optical path and emits an emission light in response to an excitation light; and a combining optical element which combines the first optical path and the second optical path into one optical path.

15 Claims, 8 Drawing Sheets

(56) References Cited

U.S. PATENT DOCUMENTS

| | | | |
|---|---|---|---|
| 2012/0188516 A1* | 7/2012 | Kashiwagi | G02B 7/006 |
| | | | 353/31 |
| 2013/0083295 A1 | 4/2013 | Miyazaki | |
| 2013/0194552 A1* | 8/2013 | Matsubara | G03B 21/2013 |
| | | | 353/31 |
| 2013/0250253 A1* | 9/2013 | Ogura | F21V 13/08 |
| | | | 353/85 |
| 2015/0029467 A1* | 1/2015 | Sugiyama | H04N 9/3161 |
| | | | 353/31 |

FOREIGN PATENT DOCUMENTS

| | | |
|---|---|---|
| JP | 2013-076836 A | 4/2013 |
| WO | 2009/073089 A1 | 6/2009 |

* cited by examiner

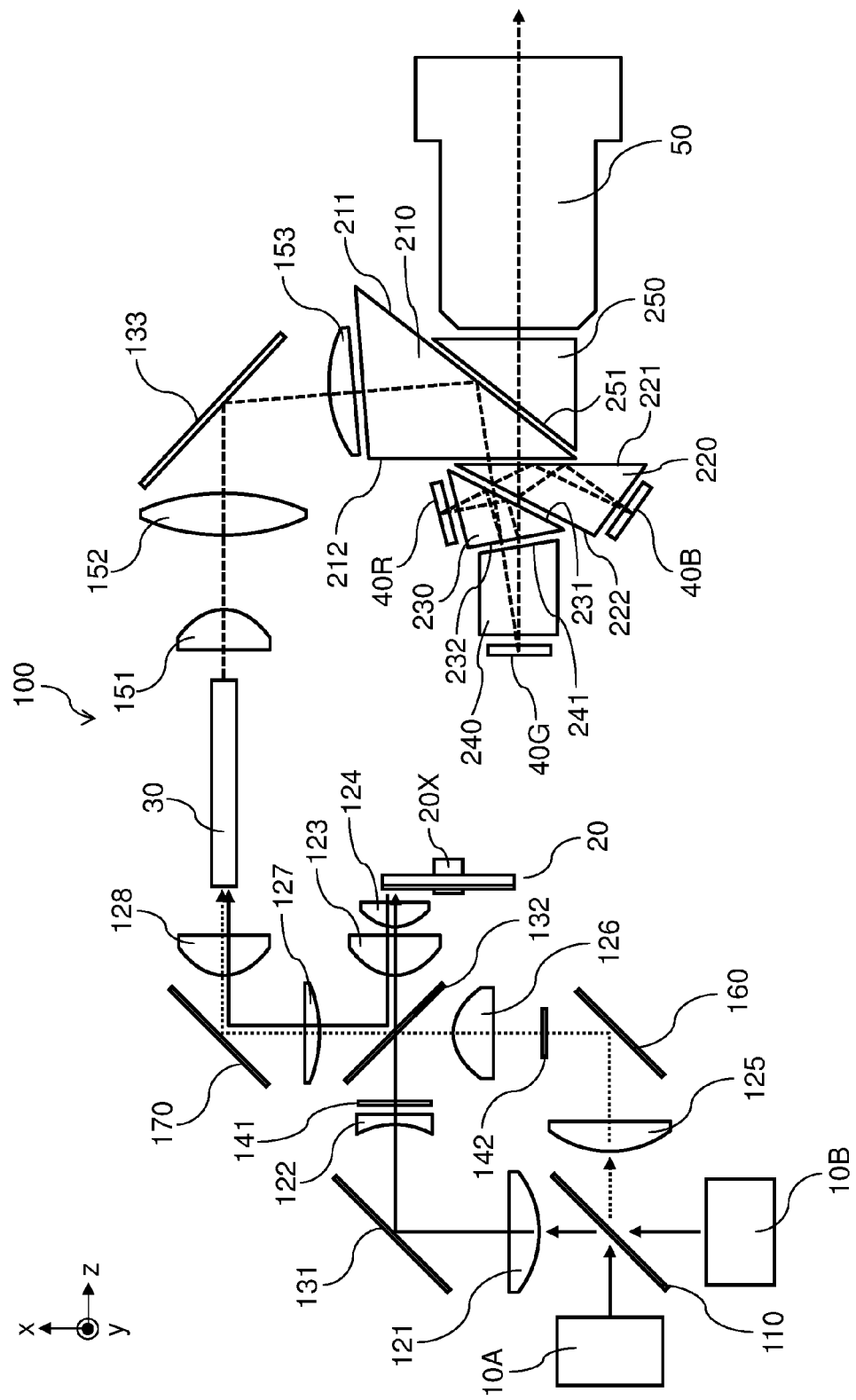

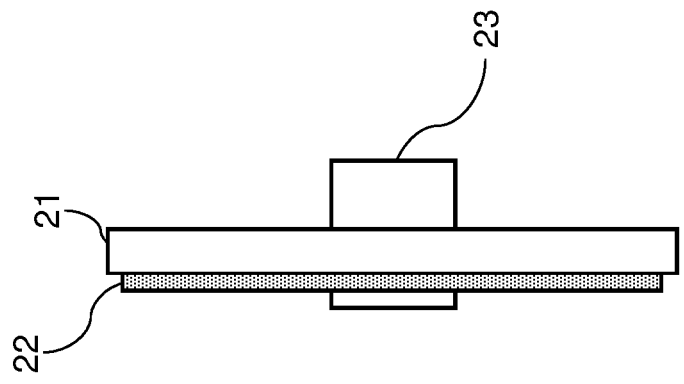
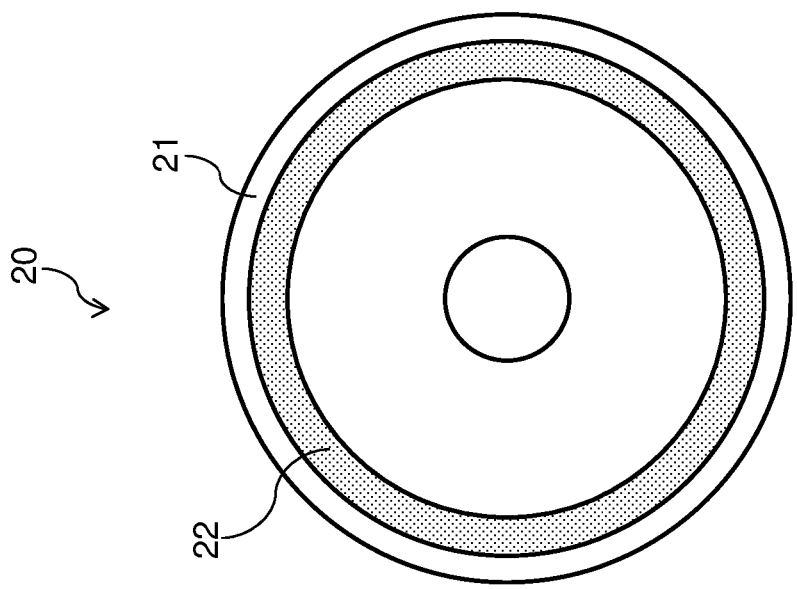

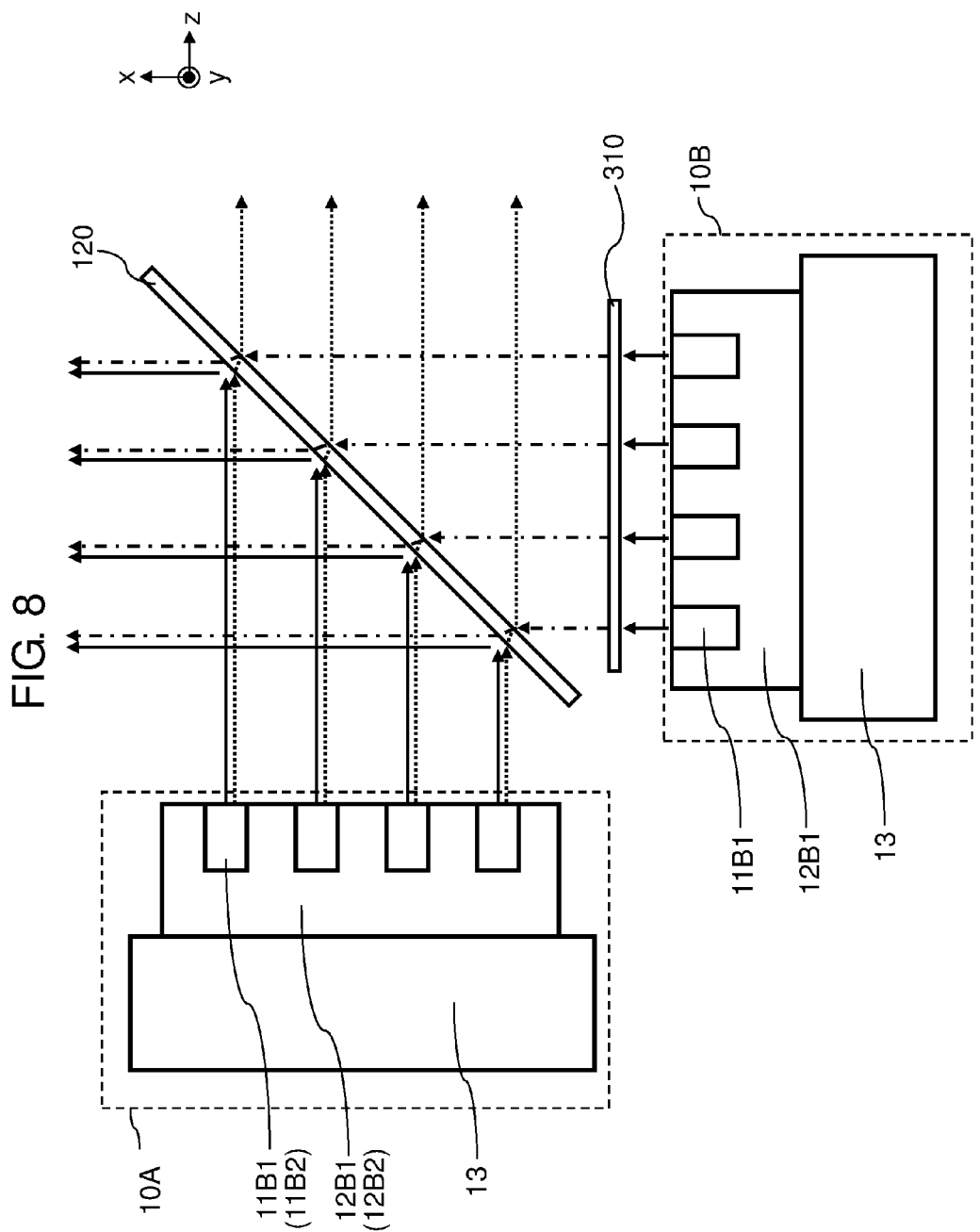

LIGHT SOURCE APPARATUS AND PROJECTION DISPLAY APPARATUS

RELATED APPLICATIONS

This application is based upon and claims the benefit of priority to Japanese Patent Application No. 2015-016838, filed on Jan. 30, 2015, and Japanese Patent Application No. 2015-253863, filed on Dec. 25, 2015, which are incorporated herein by reference in their entirety.

BACKGROUND

1. Technical Field

The present disclosure relates to a light source apparatus which includes light sources which emit excitation lights and a light emitting body which emits emission lights in response to excitation lights, and a projection display apparatus which includes the light source apparatus.

2. Description of the Related Art

PTL 1 discloses a projector which uses solid state light source arrays as light sources. A pair of solid state light source arrays are disposed to face each other, and a light from each solid state light source array is combined by mirrors and exited.

CITATION LIST

Patent Literature

PTL 1: Japanese Translation of PCT Publication No. 2011-505593

SUMMARY

The present disclosure provides a light source apparatus and a projection display apparatus which can be miniaturized.

A light source apparatus according to the present disclosure includes: a first light source unit which emits a blue light in a first direction; a second light source unit which emits a blue light in a second direction which intersects with the first direction; a split/combining optical element which splits the blue lights emitted from the first light source unit and the second light source unit, into a first optical path and a second optical path; a light emitting body which is provided on the first optical path and emits an emission light in response to an excitation light; and a combining optical element which combines the first optical path and the second optical path into one optical path.

According to the present disclosure, it is possible to provide a small light source apparatus and projection display apparatus which can split blue lights emitted from second light source units, into the first optical path and the second optical path.

BRIEF DESCRIPTION OF DRAWINGS

FIG. 1 is a view illustrating a projection display apparatus according to a first exemplary embodiment;

FIG. 2A is a plan view illustrating a phosphor wheel according to the first exemplary embodiment;

FIG. 2B is a side view of the phosphor wheel illustrated in FIG. 2A;

FIG. 8 is a view illustrating split and combining of light fluxes according to the second exemplary embodiment.

DETAILED DESCRIPTION OF THE PREFERRED EMBODIMENTS

Figure 3:
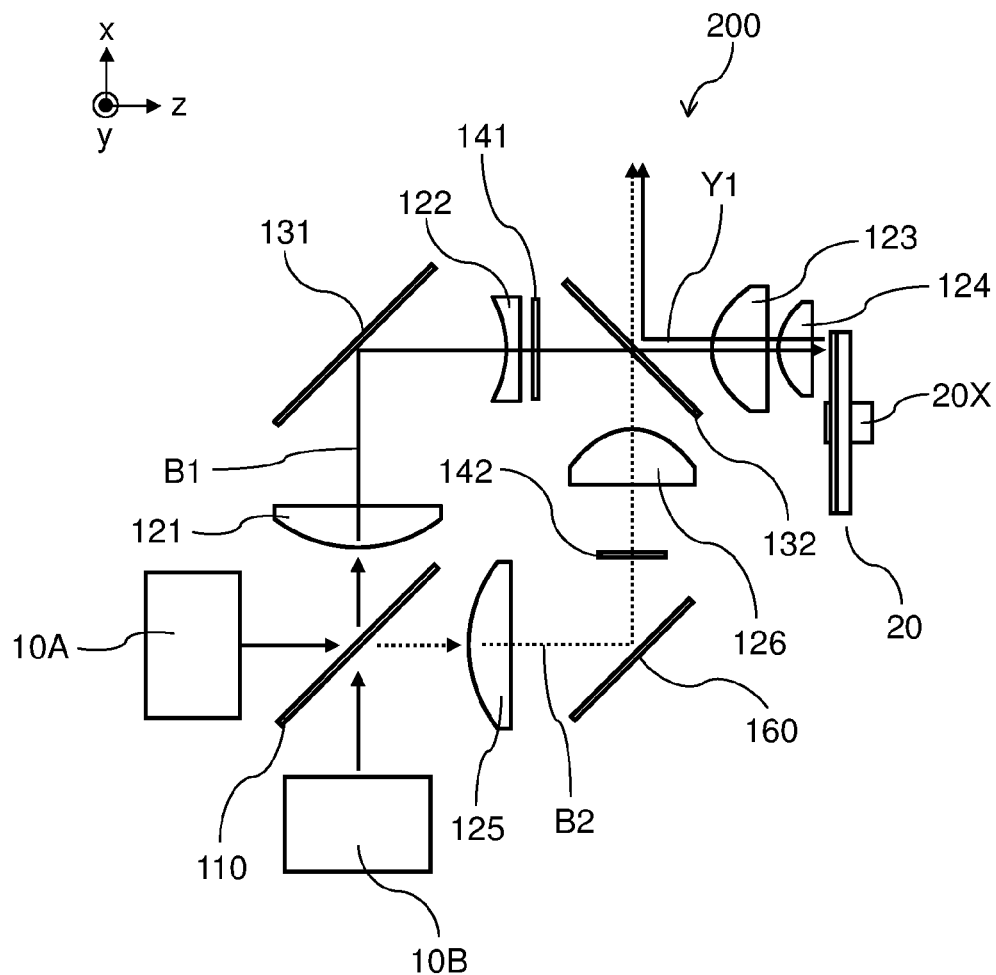
FIG. 3 is a view illustrating a light source apparatus according to the first exemplary embodiment.

Exemplary embodiments will be described in detail below optionally with reference to the drawings. In this regard, the exemplary embodiments will not be described in detail more than necessary. For example, matters which have already been well known or substantially the same components will not be described again in some cases. This is to prevent the following description from unnecessarily becoming redundant, and help one of ordinary skill in the art understand the exemplary embodiments.

In addition, the accompanying drawings and the following description are provided to help one of ordinary skill in the art sufficiently understand the present disclosure, and do not intend to limit a subject matter recited in the claims.

First Exemplary Embodiment (Projection Display Apparatus)

A configuration of a projection display apparatus according to the first exemplary embodiment will be described below with reference to FIGS. 1, 2A and 2B. FIG. 1 is a view illustrating projection display apparatus 100 according to the first exemplary embodiment.

As illustrated in FIG. 1, firstly, projection display apparatus 100 includes first light source unit 10A, second light source unit 10B, phosphor wheel 20, rod integrator 30, DMD (Digital Micromirror Device) including DMD 40R, DMD 40G and DMD 40B, and projection unit 50.

First light source unit 10A and second light source unit 10B include a plurality of solid state light sources such as laser diodes (LDs) and light emitting diodes (LED). In the present exemplary embodiment, for each solid state light source, a laser diode such as a laser diode which emits a blue light in particular is used. In this regard, each laser diode is a laser light source and an example of a light emitting element.

Emission lights from first light source unit 10A and second light source unit 10B are blue lights of wavelengths between 440 nm to 470 nm, and these blue lights are used as excitation lights for exciting a phosphor. In addition, first light source unit 10A and second light source unit 10B will be described in detail below (see FIGS. 4A and 4B).

Phosphor wheel 20 is configured to rotate about rotation shaft 20X elongated along an optical axis of an excitation light. Phosphor wheel 20 is a reflection phosphor wheel which emits an emission light in a direction opposite to an incident direction of an excitation light.

In more detail, as illustrated in FIGS. 2A and 2B, phosphor wheel 20 includes substrate 21, phosphor 22 which is annularly applied and formed on substrate 21 and in a rotation direction of substrate 21, and motor 23 which rotates substrate 21 on which phosphor 22 is formed. In addition, a reflection surface is formed by forming a reflection coating on a surface of substrate 21, and phosphor 22 is formed on this reflection surface. Phosphor 22 emits an emission light in response to excitation lights emitted from first light source unit 10A and second light source unit 10B. Lights emitted toward the reflection surface among yellow lights which are emission lights of phosphor 22 are reflected by the reflection surface. Phosphor 22 is an example of a light emitting body, and the phosphor wheel is an example of a wheel.

Phosphor 22 is a phosphor which emits fluorescent lights whose wavelength bands are mainly green to yellow. This phosphor 22 is preferably a phosphor which efficiently absorbs blue excitation lights, efficiently emits fluorescent lights and has robustness against temperature quenching. Phosphor 22 is, for example, Y3Al5O12: Ce3+ which is a cerium-activated garnet structure phosphor.

Rod integrator 30 is a solid rod made of a transparent material such as glass. Rod integrator 30 makes lights emitted from light source unit 10 uniform. In addition, rod integrator 30 may be a hollow rod whose inner wall is a mirror surface.

DMD 40 modulates lights emitted from first light source unit 10A, second light source unit 10B and phosphor wheel 20. In more detail, DMD 40 includes a plurality of micromirrors, and a plurality of micromirrors is movable. Each micromirror basically corresponds to one pixel. DMD 40 switches whether or not to reflect a light toward projection unit 50 by changing an angle of each micromirror.

In the first exemplary embodiment, as DMD 40, DMD 40R, DMD 40G and DMD 40B are provided. DMD 40R modulates red component light R based on red video signal R. DMD 40G modulates green component light G based on green video signal G. DMD 40B modulates blue component light B based on blue video signal B.

Projection unit 50 projects an image light modulated by DMD 40, on a projection surface.

Secondly, projection display apparatus 100 includes split/combining mirror 110. Split/combining mirror 110 is a mirror which combines emission lights from first light source unit 10A and second light source unit 10B, and splits part of emission lights. In addition, split/combining mirror 110 is an example of a split/combining optical element, and will not be described in detail below (see FIG. 5).

Further, projection display apparatus 100 includes a necessary mirror group. As the mirror group, mirror 131 to mirror 133, mirror 160 and mirror 170 are provided. Mirror 131, mirror 133, mirror 160 and mirror 170 are mirrors which bend optical paths. Dichroic mirror 132 is a dichroic mirror which has characteristics for allowing transmission of blue lights and reflecting yellow lights, and is an example of a combining optical element.

Further, projection display apparatus 100 includes a necessary lens group. As the lens group, lens 121 to lens 128 and lens 151 to lens 153 are provided. Lens 121 is a condenser lens which condenses emission lights from first light source unit 10A and second light source unit 10B. Lens 122 is a convex lens which converts lights condensed by lens 121 into parallel lights. Lens 123 and lens 124 are condenser lenses which condense excitation lights on the phosphor of the phosphor wheel, and convert lights emitted from the phosphor, into parallel lights. Lens 125 is a condenser lens which condenses emission lights from first light source unit 10A and second light source unit 10B. Lens 126 is a condenser lens which is disposed at a downstream of a light condensing point of lights by lens 125, and converts the condensed lights into parallel lights again. Lens 127 and lens 128 are relay lenses which guide, to rod integrator 30, emission lights from first light source unit 10A and second light source unit 10B, and an emission light from the phosphor wheel. Lens 151, lens 152 and lens 153 are relay lenses which nearly form emission lights from rod integrator 30, on each DMD 40.

Further, projection display apparatus 100 includes a necessary diffuser group. As the diffuser group, diffuser 141 and diffuser 142 are provided. Diffuser 141 is a diffuser which diffuses lights incident as nearly parallel lights. Diffuser 142 is a diffuser which is disposed near a light condensing point of light fluxes of lens 125 and diffuses the light fluxes. Diffuser 141 and diffuser 142 are configured such that, for example, micro irregularities are formed on a surface of a glass substrate. Further, the micro irregular surface may be formed on a single surface or double surfaces.

In addition, a shape of each lens is adjusted such that light emission points of emission lights from phosphor wheel 20 and an incident surface of rod integrator 30 are nearly conjugate and diffuser 142 and the incident surface of rod integrator 30 are nearly conjugate.

Thirdly, projection display apparatus 100 includes a necessary prism group. As the prism group, prism 210, prism 220, prism 230, prism 240 and prism 250 are provided.

Prism 210 is made of a transparent material, and includes surface 211 and surface 212. An air gap is provided between prism 210 (surface 211) and prism 250 (surface 251). An angle (incident angle) at which a light incident on prism 210 is incident on surface 211 is larger than a total reflection angle, and therefore the light incident on prism 210 is reflected by surface 211. Meanwhile, an air gap is provided between prism 210 (surface 212) and prism 220 (surface 221). However, an angle (incident angle) at which the light reflected by surface 211 is incident on surface 212 is smaller than the total reflection angle, and therefore the light reflected by surface 211 transmits through surface 212.

Prism 220 is made of a transparent material, and includes surface 221 and surface 222. Surface 222 is a dichroic mirror surface which allows red component light R and green component light G to transmit, and reflects blue component light B. Hence, red component light R and green component light G among lights reflected by surface 211 transmit through surface 222, and blue component light B is reflected by surface 222. Blue component light B reflected by surface 222 is reflected by surface 221, and is incident on DMD 40B. In addition, red component light R emitted from DMD 40R and green component light G emitted from DMD 40G transmit through surface 222 and surface 221.

An air gap is provided between prism 210 (surface 212) and prism 220 (surface 221). Angles (incident angles) at which blue component light B first emitted from surface 222 and blue component light B emitted from DMD 40B are incident on surface 221 are larger than the total reflection angle, and therefore blue component light B first reflected by surface 222 and blue component light B emitted from DMD 40B are reflected by surface 221. Meanwhile, an angle (incident angle) at which blue component light B reflected by surface 221 and then reflected at a second time by surface 222 is incident on surface 221 is smaller than the total reflection angle, and therefore blue component light B reflected by surface 221 and then reflected at the second time by surface 222 transmits through surface 221.

Prism 230 is made of a transparent material, and includes surface 231 and surface 232. Surface 232 is a dichroic mirror surface which allows green component light G to transmit, and reflects red component light R. Hence, green component light G among lights reflected by surface 231 transmit through surface 232, and red component light R is reflected by surface 232. Red component light R reflected by surface 232 is reflected by surface 231, and is incident on DMD 40R. In addition, green component light G emitted from DMD 400 transmits through surface 232 and surface 231.

An air gap is provided between prism 220 (surface 222) and prism 230 (surface 231). Angles (incident angles) at which red component light R transmitting through surface 231 and reflected by surface 232 and red component light R emitted from DMD 40R is incident on surface 231 are incident on surface 221 again are larger than the total reflection angle, and therefore red component light R transmitting through surface 231 and reflected by surface 232 and red component light R emitted from DMD 40R are reflected by surface 231. Meanwhile, an angle (incident angle) at which red component light R emitted from DMD 40R, reflected by surface 231 and then reflected by surface 232 is incident on surface 231 is smaller than the total reflection angle, and therefore red component light R emitted from DMD 40R, reflected by surface 231 and then reflected by surface 232 transmits through surface 231.

Prism 240 is made of a transparent material, and includes surface 241. Surface 241 is configured to allow green component light G to transmit. In addition, green component light G incident on DMD 400 and green component light G emitted from DMD 400 transmit through surface 241.

Prism 250 is made of a transparent material, and includes surface 251.

In other words, blue component light B (1) is reflected by surface 211, (2) transmits through surface 212 and surface 221, then is reflected by surface 222, (3) is reflected by surface 221, (4) is reflected by DMD 40B, (5) is reflected by surface 221, (6) is reflected by surface 222 and (7) transmits through surface 221, surface 212, surface 211 and surface 251. Thus, blue component light B is modulated by DMD 40B and is guided by projection unit 50.

Red component light R (1) is reflected by surface 211, (2) transmits through surface 212, surface 221, surface 222 and surface 231, then is reflected by surface 232, (3) is reflected by surface 231, (4) is reflected by DMD 40R, (5) is reflected by surface 231, (6) is reflected by surface 232 and (7) transmits through surface 231, surface 232, surface 221, surface 212, surface 211 and surface 251. Thus, red component light R is modulated by DMD 40R and is guided to projection unit 50.

Green component light G (1) is reflected by surface 211, (2) transmits through surface 212, surface 221, surface 222, surface 231, surface 232 and surface 241, then is reflected by DMD 400, and (3) transmits through surface 241, surface 232, surface 231, surface 222, surface 221, surface 212, surface 211 and surface 251. Thus, green component light G is modulated by DMD 400 and is guided to projection unit 50.

(Light Source Apparatus)

The light source apparatus according to the first exemplary embodiment will be described below with reference to FIGS. 3 to 6. FIG. 3 is a view illustrating light source apparatus 200 according to the first exemplary embodiment.

Light source apparatus 200 used in projection display apparatus 100 illustrated in FIG. 1 mainly includes first light source unit 10A, second light source unit 10B, split/combining mirror 110 and phosphor wheel 20. Further, light source apparatus 200 includes the necessary lens group and mirror group. These components and description of the components are the same as contents described with reference to projection display apparatus 100, and therefore will not be described again.

Figure 4A:
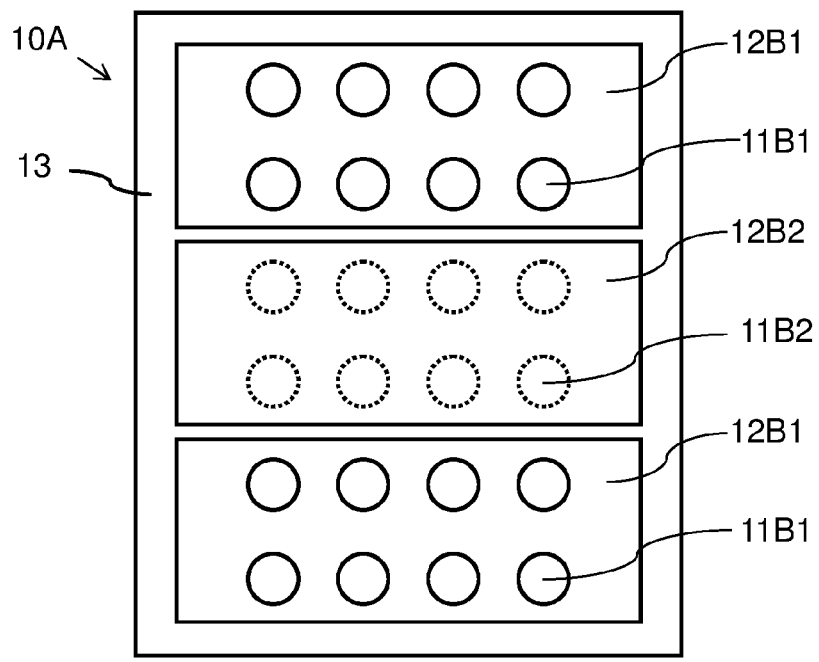
FIG. 4A is a view illustrating a first light source unit according to the first exemplary embodiment.
Figure 4B:
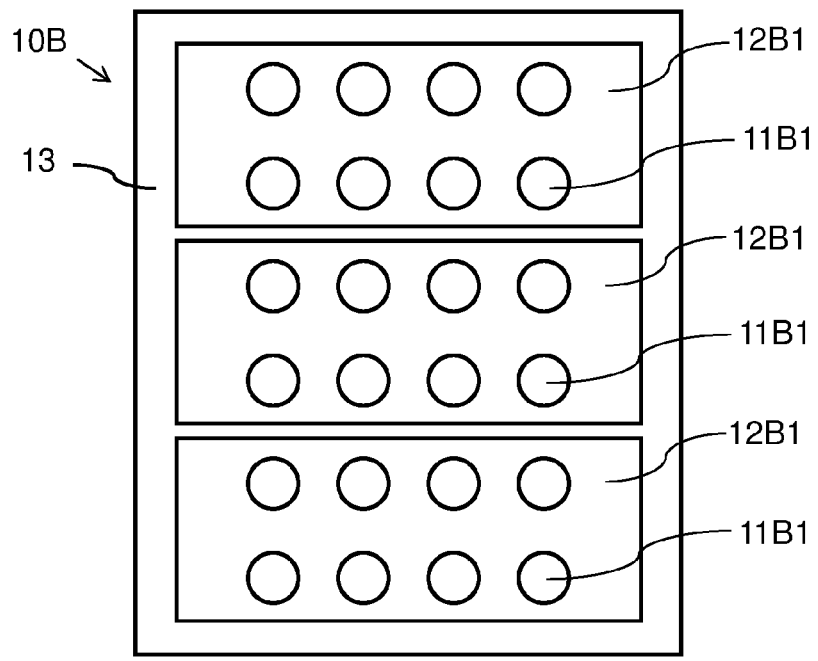
FIG. 4B is a view illustrating a second light source unit according to the first exemplary embodiment.

FIG. 4A is a view illustrating first light source unit 10A from a −z direction in FIG. 1. FIG. 4B is a view illustrating second light source unit 10B from a −x direction in FIG. 1.

First light source unit 10A includes light source blocks 12B1 and 12B2 which respectively include pluralities of laser diodes 11B1 and 11B2 which emit blue lights, and heat sink 13. Second light source unit 10B includes light source block 12B1 which includes a plurality of laser diodes 11B1 which emits blue lights, and heat sink 13. Laser diodes 11B1 and 11B2 will be collectively referred to as laser diode 11, and light source blocks 12B1 and 12B2 will be collectively referred to as light source block 12.

First light source unit 10A includes three light source blocks 12, and light source blocks 12B1 are disposed at an upper portion and a lower portion and light source block 12B2 is disposed at a center portion. Meanwhile, second light source unit 10B includes three same light source blocks 12B1.

Light source blocks 12B1 at the upper portion and the lower portion of first light source unit 10A, three light source blocks 12B1 of second light source unit 10B and light source block 12B2 at the center portion of first light source unit 10A will be assigned different reference numerals for ease of description. Further, laser diodes 11B2 are indicated by broken lines, and laser diodes 11B1 and laser diodes 11B2 which are assigned different reference numerals in the first exemplary embodiment for ease of description but have the same characteristics (wavelengths are 455 nm).

Light source block 12B1 employs a configuration where eight laser diodes 11B1 in total including four in a horizontal direction and two in a vertical direction are arranged. Light source block 12B2 employs a configuration where eight laser diodes 11B2 in total including four in the horizontal direction and two in the vertical direction are arranged.

Laser diode 11 is integrated with a collimate lens which converts an emission light into a parallel light, and laser diode 11 emits a nearly parallel light.

Heat sink 13 is made to adhere to a back surface of a light source block via, for example, a thermally conductive grease.

Figure 5:
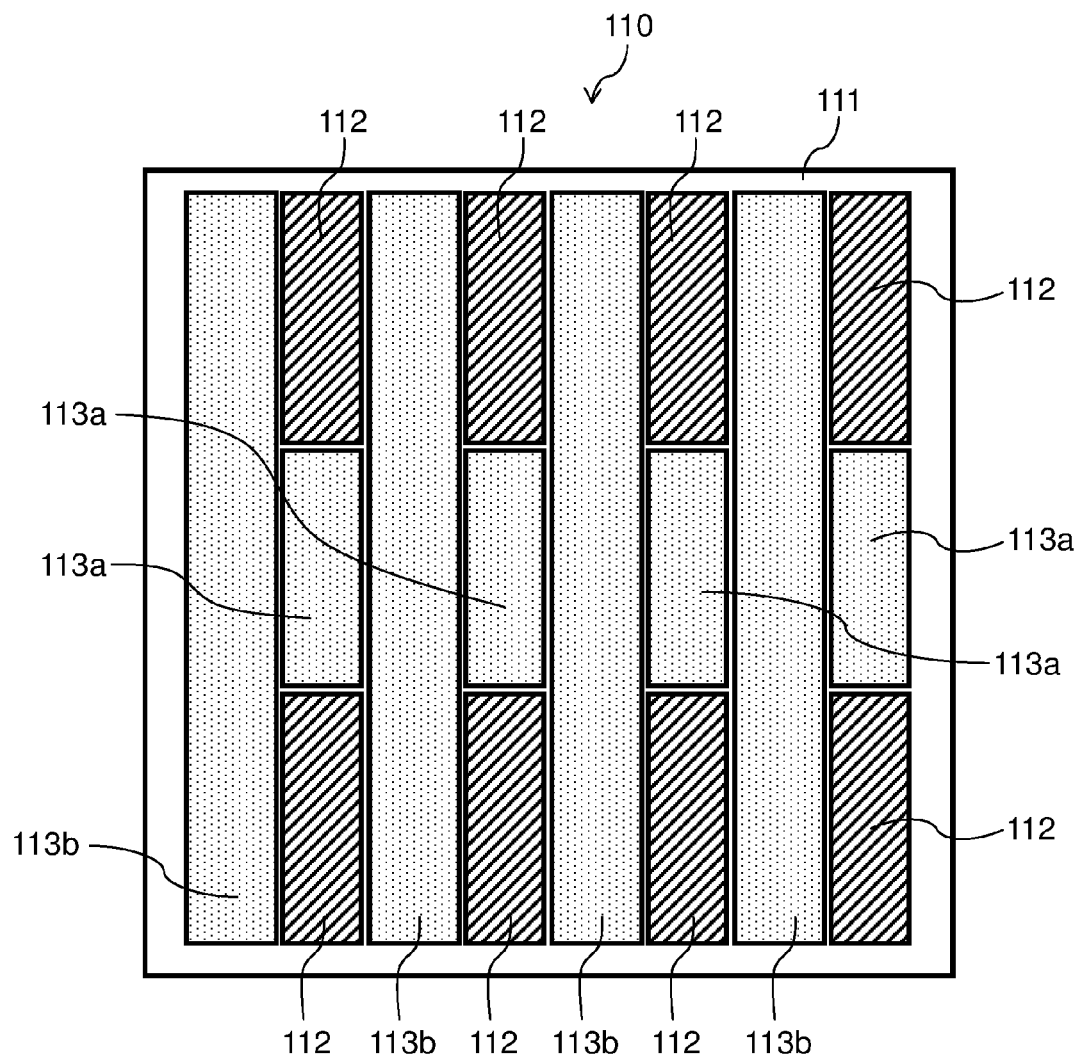
FIG. 5 is a view illustrating a split/combining mirror according to the first exemplary embodiment.

As illustrated in FIG. 5, split/combining mirror 110 is configured such that reflection areas 112 (hatching portions) and transmissive areas 113$a$ and 113$b$ (shaded portions) are formed on substrate 111. Substrate 111 is, for example, a glass substrate. On each reflection area 112, a reflection coating which reflects emission lights from first light source unit 10A and second light source unit 10B is formed. On transmissive areas 113$a$ and 113$b$, AR (Anti-Reflection) coating which allow emission lights from first light source unit 10A and second light source unit 10B to transmit are formed. In addition, it is desirable to form an AR (Anti-Reflection) coating likewise on a back surface of substrate 111, too.

In this regard, a splitting and combining operation of split/combining mirror 110 will be described with reference to FIG. 6.

Figure 6:
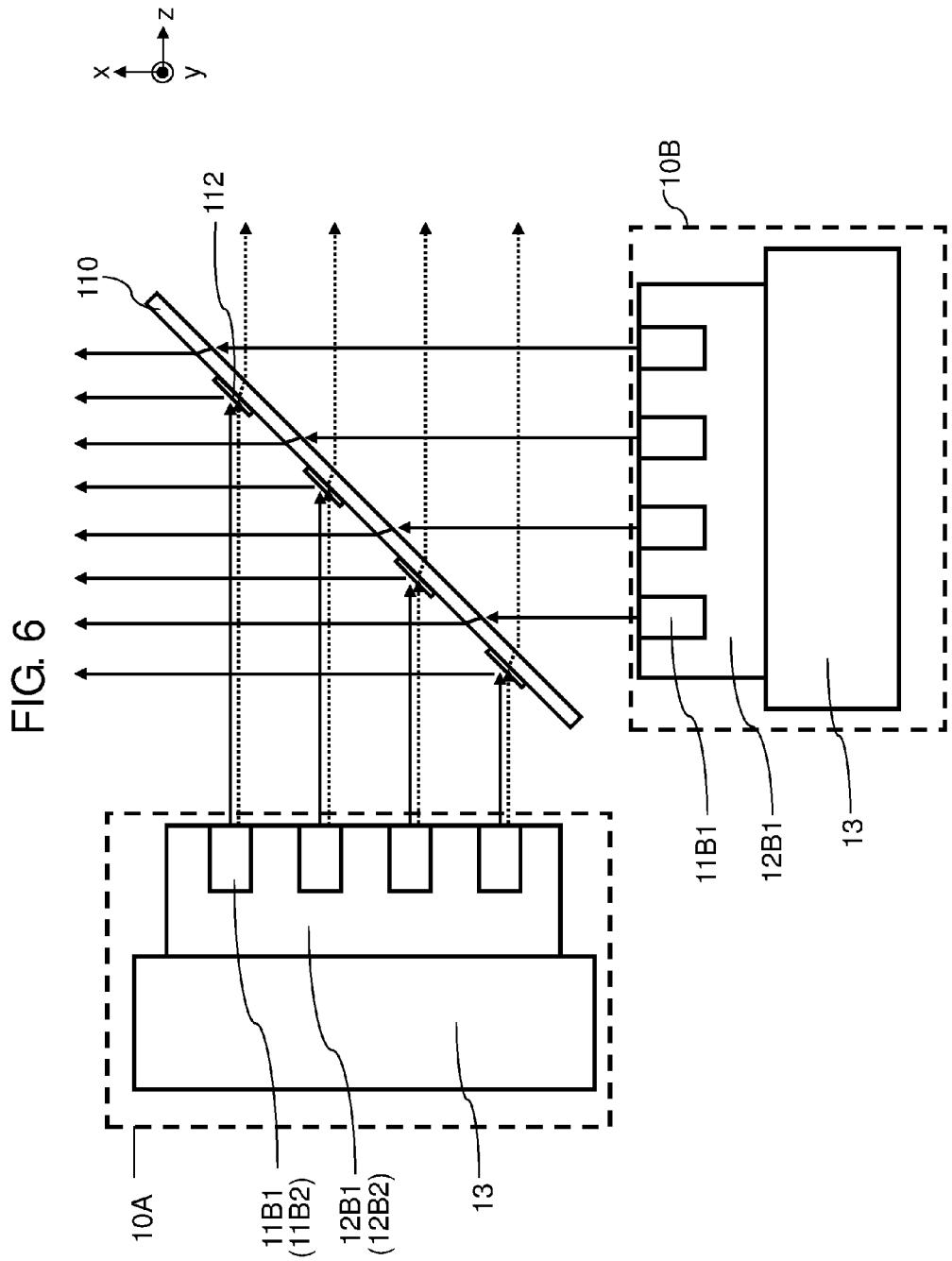
FIG. 6 is a view illustrating split and combining of light fluxes according to the first exemplary embodiment.

As illustrated in FIG. 6, first light source unit 10A emits blue lights in the z direction (first direction), and second light source unit 10B emits blue lights in the x direction (second direction). Thus, first light source unit 10A and second light source unit 10B are disposed such that respective emission directions, i.e., the first direction intersects with the second direction at 90°. Split/combining mirror 110 is disposed so as to incline toward the emission direction of the blue lights from first light source unit 10A and second light source unit 10B in this intersection area.

Emission lights from laser diodes 11B1 included in light source block 12B1 among the emission lights from first light source unit 10A are reflected at reflection areas 112 of split/combining mirror 110.

Meanwhile, emission lights (indicated by broken line arrows) from laser diodes 11B2 included in light source block 12B2 among the emission lights from first light source unit 10A transmit through transmissive areas 113a of split/combining mirror 110 (not illustrated in FIG. 6).

All emission lights from second light source unit 10B are emission lights from laser diodes 11B1 included in light source block 12B1 and transmit through transmissive areas 113b of split/combining mirror 110.

Thus, as illustrated in FIG. 6, light fluxes reflected by split/combining mirror 110 among emission lights from first light source unit 10A, and light fluxes whose emission lights are emitted from second light source unit 10B transmit through split/combining mirror 110 are alternately disposed. The alternate disposition is possible since, on split/combining mirror 110, reflection areas and transmissive areas are selectively formed to meet positions of a plurality of emission light fluxes from first light source unit 10A and second light source unit 10B.

Back to FIG. 3, the light fluxes of the emission lights from first light source unit 10A and second light source unit 10B are split into excitation light B1 for exciting phosphor wheel 20 and blue light B2 used as an image light and are combined by split/combining mirror 110.

A blue light obtained by combining the blue light reflected and split by split/combining mirror 110 and emitted from first light source unit 10A and the blue light from second light source unit 10B becomes excitation light B1. This excitation light B1 passes through an optical path (first optical path) including a route of lens 121, mirror 131, lens 122, diffuser 141, dichroic mirror 132, lens 123, lens 124 and phosphor wheel 20. Thus, excitation light B1 is applied to phosphor 22 of phosphor wheel 20 to emit yellow light Y1.

Meanwhile, part of blue lights from first light source unit 10A transmit through split/combining mirror 110, and become blue lights B2. This blue light B2 passes through an optical path (second optical path) including a route of lens 125, mirror 160, diffuser 142, dichroic mirror 126 and dichroic mirror 132. Further, yellow light Y1 and blue light B2 are combined by dichroic mirror 132 (i.e., the first optical path and the second optical path are combined into one optical path), and are emitted as a while light.

(Function and Effect)

In the first exemplary embodiment, emission light fluxes of a plurality of blue lights from first light source unit 10A and second light source unit 10B are split into the first optical path and the second optical path by split/combining mirror 110. Consequently, it is possible to use blue lights for both of excitation lights and image lights.

In the first exemplary embodiment, in order to provide high brightness of a projection display apparatus while using a plurality of laser diodes, by providing to one split/combining mirror a function of splitting emission lights from a plurality of laser diodes, into the first optical path and the second optical path, it is possible to miniaturize and simplify the light source apparatus.

Second Exemplary Embodiment

The second exemplary embodiment will be described below with reference to FIGS. 7 and 8. Differences from the first exemplary embodiment will be mainly described below, other same components as those in the first exemplary embodiment will be assigned the same reference numerals, and will not be described. Light source apparatus 201 and projection display apparatus 101 according to the second exemplary embodiment include split/combining mirror 120 instead of split/combining mirror 110 described in the first exemplary embodiment.

Figure 7:
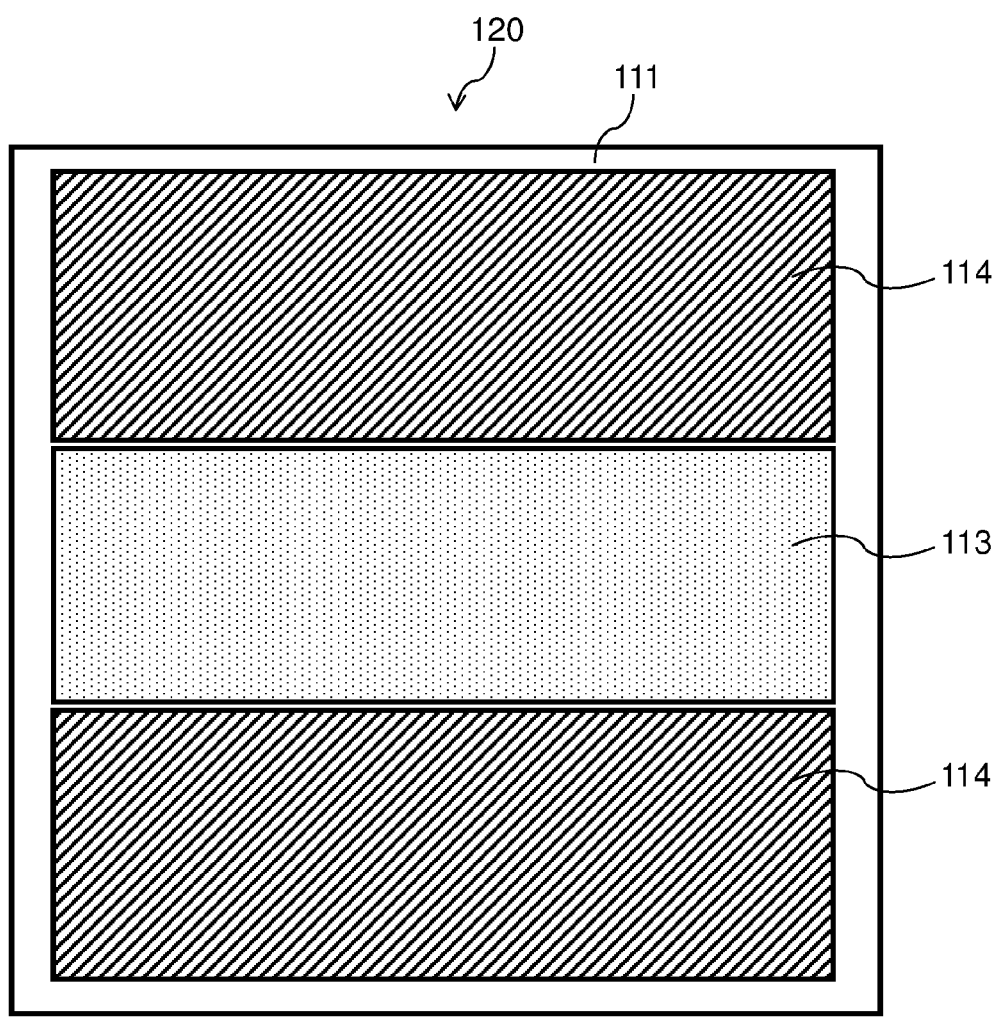
FIG. 7 is a view illustrating a split/combining mirror according to a second exemplary embodiment.

FIG. 7 is a view illustrating split/combining mirror 120 according to the second exemplary embodiment. In the first exemplary embodiment, split/combining mirror 110 includes reflection areas 112 and transmissive areas 113a and 113b. However, in the second exemplary embodiment, split/combining mirror 120 includes polarization mirror areas 114 and transmissive areas 113. Each polarization mirror area 114 is a polarization mirror film which reflects an S polarized light and allows a P polarized light to transmit. Further, in the second exemplary embodiment, polarization mirror areas 114 of split/combining mirror 120 correspond to lights emitted from light source blocks 12B1 at upper portions and lower portions of first light source unit 10A and second light source unit 10B (see FIGS. 4A and 4B), and transmissive areas 113 correspond to lights emitted from light source blocks 12B1 and 12B2 at center portions of first light source unit 10A and second light source unit 10B.

A splitting and combining function of split/combining mirror 120 according to the second exemplary embodiment will be described with reference to FIG. 8.

In the second exemplary embodiment, emission lights from first light source unit 10A and second light source unit 10B are S polarized lights (a polarization direction is a y direction) for split/combining mirror 120. Further, in the second exemplary embodiment, half-wave plate 310 is disposed between second light source unit 10B and split/combining mirror 120. Hence, emission lights from second light source unit 10B transmit through half-wave plate 310, and become P polarized (the polarization direction is a z direction) lights (indicated by dashed-dotted lines).

Emission lights from laser diodes 11B1 included in light source block 12B1 at the upper portion and the lower portion among the emission lights from first light source unit 10A are S polarized lights and are reflected at polarization mirror areas 114 of split/combining mirror 120.

Meanwhile, emission lights (indicated by broken line arrows) from laser diodes 11B2 included in light source block 12B2 at the center portion among the emission lights from first light source unit 10A transmit through transmissive areas 113 of split/combining mirror 110.

Emission lights from second light source unit 10B are S polarized lights, are converted into P polarized lights by half-wave plate 310 and transmit through polarization mirror areas 114 and transmissive areas 113.

In addition, in the second exemplary embodiment, half-wave plate 310 is disposed to adjust the polarization direction. However, half-wave plate 310 may be disposed by adjusting an orientation of light source block 12B1 included in second light source unit 10B or an orientation of laser diodes 11B1 such that the polarization direction is a desired direction.

(Function and Effect)

In the second exemplary embodiment, emission light fluxes of a plurality of blue lights from first light source unit 10A and second light source unit 10B are split into the first optical path and the second optical path by split/combining mirror 120 which uses the polarization mirror film. Consequently, it is possible to use blue lights for both of excitation lights and image lights.

In the second exemplary embodiment, in order to provide high brightness of a projection display apparatus while using a plurality of laser diodes, by providing to one split/combining mirror a function of splitting emission lights from a plurality of laser diodes, into the first optical path and the second optical path, it is possible to miniaturize and simplify the light source apparatus.

Other Exemplary Embodiments

The above exemplary embodiments have been described above as exemplary techniques disclosed in this application. However, the techniques according to the present disclosure are not limited to these, and are applicable to exemplary embodiments, too, which are changed, replaced, added or omitted. Further, it is also possible to provide new exemplary embodiments by combining components described in the above exemplary embodiments. Hereinafter, other exemplary embodiments will be described below.

Three DMDs 40R, 40O and 40B have been described as optical modulating elements in the above exemplary embodiments. However, the exemplary embodiments are not limited to this. The optical modulating element may be one DMD. Alternatively, the optical modulating element may be one liquid crystal panel or three liquid crystal panels (a red liquid crystal panel, a green liquid crystal panel and a blue liquid crystal panel). Each liquid crystal panel may be a transmissive liquid crystal panel or a reflection liquid crystal panel.

In the first exemplary embodiment and the second exemplary embodiment, wavelengths of emission lights from laser diodes 11B1 and laser diodes 11B2 are 455 nm and the same. However, the exemplary embodiments are not limited to this. Laser diodes 11B1 and laser diodes 11B2 may have different wavelengths in a blue band (440 nm to 470 nm). In this case, as, for example, laser diode 11B1 used at the upper portion and the lower portion of first light source unit 10A and used by three light source blocks 12B1 of second light source unit 10B, laser diodes having characteristics for emitting suitable wavelengths to excite a phosphor are used. By contrast with this, for laser diode 11B2 used in light source block 12B2 at the center portion of first light source unit 10A, laser diodes having characteristics for emitting blue lights which provide preferable colors when lights are used as image lights. For example, a wavelength of a blue light which is an excitation light is 445 nm, and a wavelength of a blue light which is an image light is 465 nm.

In the first exemplary embodiment and the second exemplary embodiment, phosphor wheel 20 has been described as a light emitting body which produces a reference lights. The exemplary embodiments are not limited to this. A light emitting body may be a static inorganic phosphor ceramic. Alternatively, the light emitting body may be a phosphor.

In the first exemplary embodiment and the second exemplary embodiment, split/combining mirrors 110, 120 have been described. However, formation patterns of reflection area 112, transmissive areas 113, 113a, 113b and polarization mirror areas 114 are not limited to this. For example, transmissive areas 113a, 113 of split/combining mirrors 110, 120 illustrated in FIGS. 5 and 7 may be provided at the upper portion or the lower portion not at the center portion.

In the first exemplary embodiment and the second exemplary embodiment, an example where blue lights emitted from first light source unit 10A are split into a first optical path and a second optical path by split/combining mirrors 110, 120. However, blue lights emitted from second light source unit 10B are split into the first optical path and the second optical path. Further, it is also possible to split both blue lights emitted from first light source unit 10A and second light source unit 10B, into the first optical path and the second optical path, and combine the both blue lights in both of the first optical path and the second optical path. In this case, for example, this split and combining can be realized at forming reflection areas in part of transmissive areas 113b illustrated in FIG. 5. Further, in FIG. 8, part of emission lights from second light source unit 10B may not transmit through half-wave plate 310.

In addition, the above exemplary embodiment is an exemplary embodiment of the technique according to the present disclosure, and therefore can be variously changed, replaced, added and omitted in a range of the claims or a range equivalent to the claims.

The present disclosure is applicable to a projection display apparatus such as a projector.

What is claimed is:

1. A light source apparatus comprising:
   a first light source unit which emits a blue light in a first direction;
   a second light source unit which emits a blue light in a second direction which intersects with the first direction;
   a split/combining optical element which splits the blue lights emitted from the first light source unit and the second light source unit, into a first optical path and a second optical path;
   a light emitting body which is provided on the first optical path and emits an emission light in response to an excitation light; and
   a combining optical element which combines the first optical path and the second optical path into one optical path,
   wherein the split/combining optical element combines the blue light emitted from the first light source unit and split into the first optical path, and the blue light emitted from the second light source unit.

2. The light source apparatus according to claim 1, wherein
   the first light source unit and the second light source unit each include a plurality of light source blocks in which a plurality of light emitting elements is arranged; and
   the blue light emitted from at least one of the plurality of light source blocks included in the first light source unit and the second light source unit is split into the second optical path.

3. The light source apparatus according to claim 1, wherein the blue lights split into the first optical path and the second optical path have different wavelengths.

4. The light source apparatus according to claim 1, wherein the combining optical element combines the emission light of the first optical path and the blue light of the second optical path into one optical path.

5. The light source apparatus according to claim 1, wherein the split/combining optical element is an optical mirror in which a reflection area and a transmissive area are selectively formed to meet positions of a plurality of emission light fluxes from the first light source unit and the second light source unit, and is disposed so as to incline toward an emission direction of the blue lights emitted from the first light source unit and the second light source unit.

6. The light source apparatus according to claim 1, wherein the split/combining optical element is an optical mirror in which a polarization mirror area and a transmissive area are selectively formed to meet positions of a plurality of emission light fluxes from the first light source unit and the second light source unit, and is disposed so as to incline toward an emission direction of the blue lights emitted from the first light source unit and the second light source unit.

7. A projection display apparatus comprising the light source apparatus according to claim 1.

8. The light source apparatus according to claim 1, wherein the split/combining optical element combines the blue light emitted from the second light source unit and split into the first optical path, and the blue light emitted from the first light source unit.

9. The light source apparatus according to claim 8, wherein the split/combining optical element combines the blue light emitted from the first light source unit and split into the first optical path, and the blue light emitted from the second light source unit and split into the first optical path.

10. The light source apparatus according to claim 9, wherein the split/combining optical element combines the blue light emitted from the first light source unit and split into the second optical path, and the blue light emitted from the second light source unit and split into the second optical path.

11. A light source apparatus comprising:
a first light source unit which emits a blue light in a first direction;
a second light source unit which emits a blue light in a second direction which intersects with the first direction;
a split/combining optical element which splits the blue lights emitted from the first light source unit and the second light source unit, into a first optical path and a second optical path;
a light emitting body which is provided on the first optical path and emits an emission light in response to an excitation light; and
a combining optical element which combines the first optical path and the second optical path into one optical path;
wherein the split/combining optical element is an optical mirror in which a polarization mirror area and a transmissive area are selectively formed to meet positions of a plurality of emission light fluxes from the first light source unit and the second light source unit, and is disposed so as to incline toward an emission direction of the blue lights emitted from the first light source unit and the second light source unit.

12. The light source apparatus according to claim 11, wherein
the first light source unit and the second light source unit each include a plurality of light source blocks in which a plurality of light emitting elements is arranged; and
the blue light emitted from at least one of the plurality of light source blocks included in the first light source unit and the second light source unit is split into the second optical path.

13. The light source apparatus according to claim 11, wherein the blue lights split into the first optical path and the second optical path have different wavelengths.

14. The light source apparatus according to claim 11, wherein the split/combining optical element splits the blue light emitted from the first light source unit, into the first optical path and the second optical path, and combines the blue light emitted from the first light source unit and split into the first optical path, and the blue light emitted from the second light source unit.

15. The light source apparatus according to claim 11, wherein the combining optical element combines the emission light of the first optical path and the blue light of the second optical path into one optical path.

* * * * *